United States Patent [19]

Aleck

[11] 4,322,062
[45] Mar. 30, 1982

[54] TORSION SPRING DAMPER

[75] Inventor: Benjamin J. Aleck, Jackson Heights, N.Y.

[73] Assignee: Grumman Aerospace Corporation, Bethpage, N.Y.

[21] Appl. No.: 107,340

[22] Filed: Dec. 26, 1979

[51] Int. Cl.³ .............................................. B60T 11/10
[52] U.S. Cl. ............................. 267/154; 64/27 NM; 267/57.1 R; 280/721; 403/225; 403/228
[58] Field of Search ............. 267/57.1 A, 63 A, 54 A, 267/154, 153; 64/27 NM; 403/225, 228; 280/695, 700, 717, 721

[56] References Cited

U.S. PATENT DOCUMENTS

| | | | |
|---|---|---|---|
| 2,095,947 | 10/1937 | Herold | 267/57.1 A |
| 2,162,198 | 6/1939 | Herrington | 267/57.1 A |
| 2,267,312 | 12/1941 | Smith | 267/63 A X |
| 2,270,572 | 1/1942 | Woolson et al. | 267/57.1 A |
| 2,352,586 | 6/1944 | Kilborn et al. | |
| 2,393,183 | 1/1946 | Parker | 280/717 X |
| 2,476,894 | 7/1949 | Mulheim | 64/27 NM X |
| 2,584,667 | 2/1952 | Bockrath | |
| 3,020,036 | 2/1962 | Kleinschmidt | |
| 3,147,964 | 9/1964 | Wolf | 267/57.1 A X |
| 3,334,886 | 8/1967 | Caunt | |
| 3,365,213 | 1/1968 | Bentley et al. | 403/225 X |
| 3,521,464 | 7/1970 | Kidby | 64/27 NM X |

FOREIGN PATENT DOCUMENTS

| | | | |
|---|---|---|---|
| 15114 | 7/1929 | Australia | 403/225 |
| 552012 | 1/1923 | France | |
| 457576 | 12/1936 | United Kingdom | 267/54 A |

Primary Examiner—George E. A. Halvosa
Attorney, Agent, or Firm—Richard G. Geib; Mellor A. Gill

[57] ABSTRACT

A torsional damper integral with a torsion bar wherein the damper is not directly connected to any support structure. Torque applied by the torsion bar to the damper on one side of the damper's mid length is equilibrated by torque exerted by the torsion bar to the damper on the opposite side of its mid length. In this manner, a part of the torsion load is transmitted to the energy dissipating damper.

11 Claims, 4 Drawing Figures

TORSION SPRING DAMPER

BACKGROUND

The present invention relates to torsion units, and more particularly, to torsion units including a resilient damping material interposed between an inner and/or outer load bearing members. The invention finds particular use in connection with motor vehicles and hydraulic damping systems.

Heretofore, torsion dampers have been made by bonding an elastomeric annulus between an outer sleeve and an inner member as to allow some degree of relative movement between the inner and outer members. This relative movement serves to cushion shock transmission between the two members by translating this force to compression or torsional shear applied to the resilient annulus. Conventionally, one of the two members is fixed to a drive shaft while the concentric member is secured to the driven member. Alternatively, the damper is attached between the held end of a torsion bar and the chassis.

Still other proposals have included segmenting the length of one of the members so as to alter the deformability of apparatus. In each case, the proposed systems have required that a non-load bearing member be secured to a relatively rigid supporting structure as to transfer stress to resilient annulus.

In some applications, it is difficult or inconvenient to connect a torsion unit to a supporting structure due to a lack of access to the connecting point or due to the nature of the connection or interrelationship or adjacent parts. One extreme example of such a situation relates to military tank vehicles for which there is no practical access to the tank underside to allow for making any attachments. Moreover, even in the case of vehicles with more accessible undersides, installation of presently available torsion units generally requires additional labor expense related to the time needed to remove and reattach the torsion unit to the structure.

Accordingly, it is the general object of this invention to avoid and overcome the foregoing and other difficulties and objections to torsion units by providing an improved torsion unit requiring no separate attachment of the damping unit to any supporting structure whatsoever.

It is another object of this invention to provide a torsion unit wherein the torsional load is shared longitudinally along the length of the torsion damping layer.

SUMMARY OF THE INVENTION

The foregoing and other objects of my invention are achieved by providing a torsional unit including a high strength, high stiffness torsion bar encompassed by a resilient annulus and an outer sleeve. The torsion unit is further constructed to have sufficient length and is composed of selected elastomeric and rigid members as to translate torsional load applied to the torsion bar to a longitudinally distributed force on the elastomeric layer.

DESCRIPTION OF THE DRAWINGS

The above and other features, objects and advantages of the present invention will become more readily apparent from the following description, reference being made to the accompanying drawings in which.

SPECIFIC DESCRIPTIONS

Figure 1:
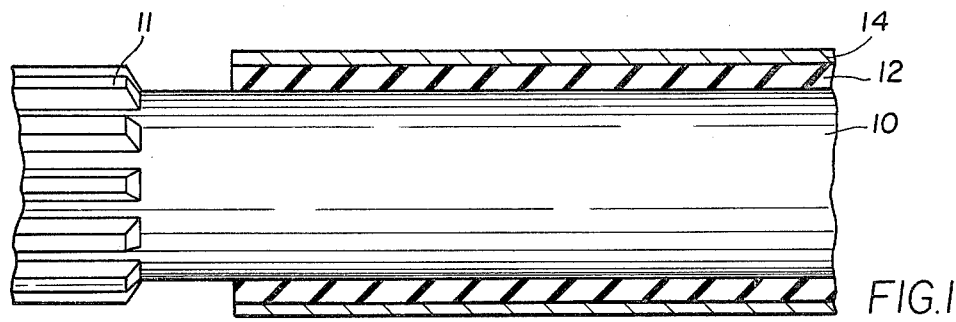
FIG. 1 is a longitudinal sectional view of one embodiment of the invention.

FIG. 1 depicts one embodiment of the present invention including a high strength torsion bar 10 encompassed by an elastomeric annulus 12 and outer sleeve 14. Annulus 12 may be formed from various elastomeric materials chosen for their damping characteristics. By way of example, such suitable materials would include natural and synthetic rubbers and some plastics.

Annulus 12 is vulcanized or bonded to members 10 and 14 as would be apparent to one skilled in the art. Outer sleeve 14 may be constructed of metallic or nonmetallic such as reinforced plastics. The sleeve is designed to sustain the torque transmitted through the annulus 12. The sleeve must be sufficiently rigid next to the annular material so that it resists the torque distributed along the length of annulus 12. At the end of torsion bar 10 is spline portion 11 which may be formed by puffing an end of the torsion bar after the annulus and outer sleeve have been positioned.

Figure 2:
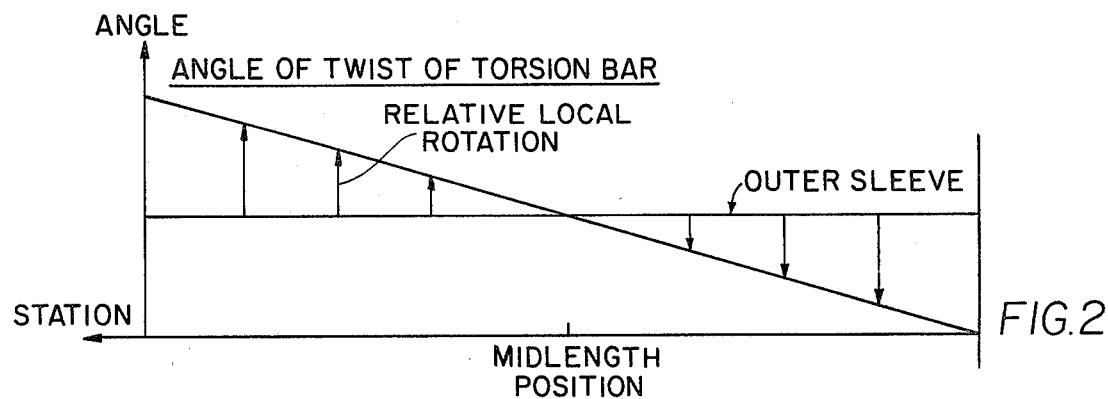
FIG. 2 is a graphical representation of the relative motion of points on the outer cylinder and inner torsion bar at various points along the length of the torsion bar.
Figure 3:
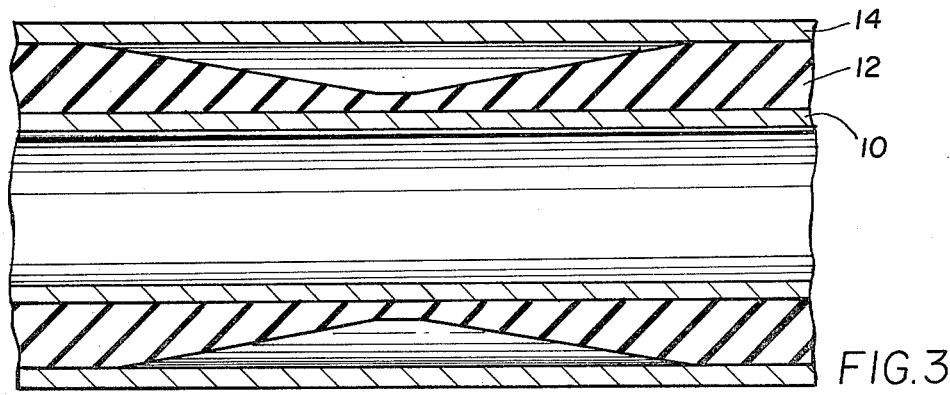
FIG. 3 illustrates an alternative embodiment of the invention wherein the thickness of the annular damping level varies with the distance from the longitudinal midpoint of the cylinder.

FIG. 2 illustrates a typical relationship between the torque applied to the elastic material in one location and the resulting opposing torque in another. FIG. 2 illustrates a scenario wherein the elastic deformation of the sleeve is negligible with respect to the elastic deformation of the torsion bar. Furthermore, the angle of rotation of the sleeve 14 is zero with respect to the station mid length of the sleeve, and the relative rotation at one end of the sleeve is equal and opposite to the relative rotation at the other end. Assuming a uniformly thick annulus, the shear stress increases linearly from the mid length on the center line toward the ends. If the thickness of the annulus is varied linearly with the distance from the mid length, the shear stress would be of constant magnitude at all points along the length. This configuration is illustrated in FIG. 3.

Total available damping energy is limited by the total volume of damping material used. The narrower the annulus, the higher the relative shear strains and the higher the damping efficiency. If the elastomeric material is not sufficiently flexible to take these strains, the alternative is to make the outer sleeve in shorter segments. Each segment behaves exactly the same as that in FIG. 1, except for a rigid body motion superposed, which does not affect the energy absorption mechanism. Thus, if there were two segments and the segments and the torsion bar twisted 60°, the midpoint in FIG. 1 would turn through 30°. If the outer tube were cut in half, the one near the clamped end would turn through 15° while the one at the moving end would turn through 45°. The midpoint on the torsion bar would turn through 30° or 15° with respect to each half. Likewise, the ends would turn through 15° with respect to the adjacent sleeve.

Figure 4:
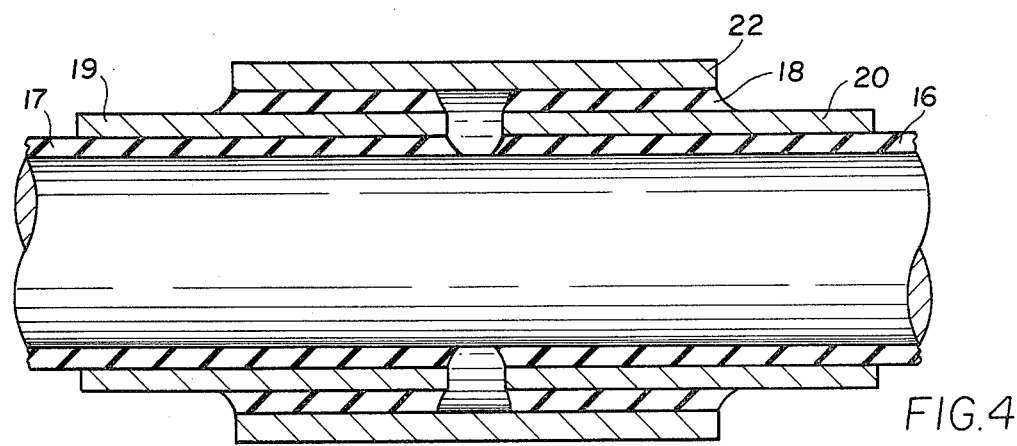
FIG. 4 is a longitudinal sectional view of a multilayered embodiment of the invention.

FIG. 4 depicts an alternate embodiment of the present invention using a multi-layered system. Instead of a single resilient annulus and outer sleeve as shown in FIG. 1, the system of FIG. 4 includes a torsion bar 10 encompassed by three resilient layers 16, 17 and 18 adjacent to sleeves 19, 20 and 22. This embodiment defines a construction wherein the inner annulus is linearly segmented into sections 19 and 20 while also disclosing the use of overlapping plies to increase the thickness of the overall outer sleeve construction. The manner of operation in FIG. 4 is the same as that previously described in connection with FIG. 1.

While the invention has been described with reference to two particular embodiments, it is to be understood that further modifications or variations may be easily made by those skilled in the art without departing from the scope of this invention as defined by the appended claims.

What is claimed is:

1. A torsion damper system for a torsion load producing structure comprising:
a torsion bar having a greater length than width which undergoes elastic deformation when subjected to a torsional load;
a means for connecting a torsional load to the torsion bar;
a layer of damping material encircling the torsion bar and bonded to said torsion bar such that a torsional load applied to the torsion bar loads the damping material in shear; and
an outer cylinder encircling the layer of damping material and bonded to said damping material to receive shear loads from said layer of damping material, said outer cylinder having no separate attachment to any other structure when the torsion damper system is connected to said torsion load producing structure.

2. The system as recited in claim 1 wherein said torsion bar comprises a solid metallic member.

3. The system as recited in claim 1 wherein said torsion bar comprises a hollow tube.

4. The system as recited in claim 1 wherein the thickness of said layer of damping material is substantially constant throughout the length of said cylinder.

5. The system as recited in claim 1 wherein the thickness of said layer of damping material varies with the distance from the longitudinal midpoint of said cylinder such that the shear load on said layer of damping material is of constant magnitude at all points along its length.

6. The system as recited in claim 5 wherein the thickness of said layer of damping material varies linearly with the distance from the longitudinal midpoint of said cylinder.

7. The system as recited in claim 1 wherein the means for connecting comprises a spline portion at one end of the torsion bar.

8. The system as recited in claim 1 wherein said damping material comprises a layer of rubber.

9. The system as recited in claim 1 wherein said damping material comprises a layer of plastic.

10. The system as recited in claim 1 wherein said outer cylinder is segmented into a plurality of spaced cylindrical sections coaxial with said torsion bar.

11. A torsion spring damper system for a torsion load producing structure comprising:
a high strength, high stiffness torsion bar having a greater length than width which undergoes elastic deformation when subjected to a torsional load;
a means for connecting a torsional load to the torsion bar;
a first segmented cylindrical layer of damping material encircling the torsion bar and bonded to said torsion bar to be loaded in shear by the elastic deformation of the torsion bar;
a correspondingly segmented first outer sleeve encircling the first layer of damping material and bonded to said first segmented cylindrical layer of damping material such that the shear load of each segment of the first layer of damping material is transmitted to the corresponding segment of said segmented first outer sleeve;
a second segmented cylindrical layer of damping material encircling the first outer sleeve and bonded to said first outer sleeve to receive shear loads therefrom; and
a second outer sleeve encircling the second layer of damping material and bonded to said second segmented cylindrical layer such that the shear loads of said second segmented cylindrical layer of damping material is transmitted to said second outer sleeve, said second outer sleeve having no separate attachment to any other structure when the torsion damper system is connected to said torsion load producing structure.

* * * * *